United States Patent
Fan

(10) Patent No.: US 12,146,012 B2
(45) Date of Patent: Nov. 19, 2024

(54) BIS-PHOSPHINIMIDE CATALYSTS FOR OLEFIN POLYMERIZATION

(71) Applicant: NOVA CHEMICALS (INTERNATIONAL) S.A., Fribourg (CH)

(72) Inventor: Cheng Fan, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 636 days.

(21) Appl. No.: 17/601,668

(22) PCT Filed: Mar. 31, 2020

(86) PCT No.: PCT/IB2020/053059
§ 371 (c)(1),
(2) Date: Oct. 5, 2021

(87) PCT Pub. No.: WO2020/208473
PCT Pub. Date: Oct. 15, 2020

(65) Prior Publication Data
US 2022/0169763 A1   Jun. 2, 2022

(30) Foreign Application Priority Data

Apr. 8, 2019 (CA) ..................... 3039441

(51) Int. Cl.
*C07F 9/535* (2006.01)
*C08F 210/16* (2006.01)

(52) U.S. Cl.
CPC .......... *C08F 210/16* (2013.01); *C07F 9/5355* (2013.01)

(58) Field of Classification Search
CPC .............................. C07F 9/5355; Y02P 20/52
See application file for complete search history.

(56) References Cited

U.S. PATENT DOCUMENTS

| | | | |
|---|---|---|---|
| 5,589,555 A | 12/1996 | Zboril et al. | |
| 6,234,950 B1 * | 5/2001 | Von Haken Spence | C08F 10/02 506/155 |
| 6,239,238 B1 * | 5/2001 | Brown | C07F 9/5355 526/348 |
| 6,372,864 B1 * | 4/2002 | Brown | C08F 10/02 526/127 |
| 6,649,558 B2 * | 11/2003 | Brown | C07F 7/00 502/103 |
| 6,777,509 B2 | 8/2004 | Brown et al. | |
| 10,000,595 B1 * | 6/2018 | Cruz | C08F 4/642 |
| 2001/0007895 A1 * | 7/2001 | Brown | C07F 7/00 526/172 |
| 2007/0111883 A1 * | 5/2007 | Jayaratne | C08F 10/00 502/103 |
| 2012/0259081 A1 * | 10/2012 | Henderson | C08F 210/16 502/107 |
| 2019/0241683 A1 * | 8/2019 | Morrison | C08F 4/65908 |
| 2023/0235100 A1 * | 7/2023 | Gao | C08F 4/6592 526/133 |

FOREIGN PATENT DOCUMENTS

| | | | | |
|---|---|---|---|---|
| CA | 2237231 A1 | * | 11/1999 | ............ B01J 23/007 |
| CA | 2365539 A1 | * | 6/2002 | ............ B01J 31/06 |
| CA | 2423921 A1 | * | 9/2004 | ............ B01J 31/143 |
| CA | 2820501 A1 | * | 12/2014 | ............ C07F 17/00 |
| EP | 1135421 B1 | | 1/1999 | |
| EP | 1801113 A1 | * | 6/2007 | .......... B01J 31/1815 |
| WO | WO2005014601 A2 | | 2/2005 | |

OTHER PUBLICATIONS

Hollink; Organometallics, vol. 23, No. 7, 2004, pp. 1562-1569. (Year: 2004).*
Ong; "Group 13 and 14 imine and phosphinimide complexes". (Year: 2001).*
Stephan; Advances in Organometallic Chemistry; "Sterically Demanding Phoshpinimides . . . Chemistry" (Year: 2006).*
Stephan; Macromol. Symp., 173, 2001, pp. 105-115) (Year: 2001).*
Stewart; Phosphinimde complexes of titanium . . . organometallic compounds. (Year: 2000).*
Yadav; "Titanium complexes of phosphinimde ligands . . . donars". (Year: 2007).*
Stephan et al; Organometallics, 1999, 18, pp. 1116-1118. (Year: 1999).*
Stephan; Organometallics, 2005, 24, pp. 2548-2560;. (Year: 2005).*
Pangborn, Amy B., et al. "Safe and Convenient Procedure for Solvent Purification", Organometallics 1996, 15, 1518-1520, 3 pages.
Nancy L. S. Yue and Douglas W. Stephan; "Phosphinimide-Phosphinimide Ligands: New Bulky Ligands for ethylene Polymerization Catalysts", Organometallics 2001, 20, 2303-2308, Feb. 13, 2001, 6 pages.

(Continued)

*Primary Examiner* — Karuna P Reddy
(74) *Attorney, Agent, or Firm* — Thomas J. Styslinger

(57) ABSTRACT

A phosphinimide catalyst system comprises: i) a phosphinimide pre-polymerization catalyst having two phosphinimide ligands, at least one of which is substituted by a phosphinimide moiety; and ii) a catalyst activator. The catalyst system polymerizes ethylene with an alpha-olefin to give high molecular weight ethylene copolymer.

10 Claims, No Drawings

(56) References Cited

OTHER PUBLICATIONS

Designation: D6645-01 (Reapproved 2010); "Standard Test Methods for Methyl (Comonomer) Content in Polyethylene by Infrared Spectrophotometry", ASTM International, dated Jan. 1, 2010 (originally approved 2001), 4 pages.

Designation: D6474-12; "Standard Test Method for Determining Molecular Weight Distribution and Molecular Weight Averages of Polyolefins by High Temperature Gel Permeation Chromatography", ASTM International, Oct. 16, 2019, 6 pages.

International Search Report and Written Opinion corresponding to PCT Application No. PCT/IB2020/053059, dated Jun. 23, 2020, 7 pages.

* cited by examiner

BIS-PHOSPHINIMIDE CATALYSTS FOR OLEFIN POLYMERIZATION

CROSS-REFERENCE TO RELATED PATENT APPLICATIONS

This application is a U.S. National Phase Application under 35 U.S.C. § 371 of International Application No. PCT/IB2020/053059, filed Mar. 31, 2020, which claims the benefit of priority to CA 3,039,441, filed on Apr. 8, 2019, both of which are incorporated herein by reference in their entirety.

TECHNICAL FIELD

A new group 4 transition metal polymerization catalyst, one which bears two phosphinimide ligands, at least one of which is itself further substituted by a phosphinimide moiety, polymerizes ethylene with an alpha-olefin to produce ethylene copolymers having high molecular weight.

BACKGROUND ART

The use of heteroatom substituted phosphinimide ligands to support group 4 transition metal catalysts has been explored previously. In U.S. Pat. No. 6,234,950, it was shown that when a phosphinimide ligand was substituted by three dimethyl amido groups (i.e. —N═P(NMe$_2$)$_3$) and used in combination with a cyclopentadienyl ligand in the coordination sphere of titanium, a useful olefin polymerization catalyst was produced. When suitably activated, the species CpTi(N═P(NMe$_2$)$_3$)Me$_2$ copolymerized ethylene with 1-octene at 160° C. at an activity, $k_p$ of up to 648 L/mmol·min in the solution phase (where the polymerization activity is defined as:

$$k_p = \left(\frac{Q}{100-Q}\right)\left(\frac{1}{[Ti]}\right)\left(\frac{1}{HUT}\right),$$

where Q is ethylene conversion (%), [Ti] is catalyst concentration in the reactor (in mmol/L), and HUT is hold-up time of the catalyst in the reactor.

Transition metal catalysts bearing two phosphinimide ligands are also known in the art. U.S. Pat. No. 6,649,558 discloses the use of Ti(N═P(tert-Bu)$_3$)$_2$Me$_2$ in the solution phase polymerization of ethylene at 160° C. When activated with trityl borate, the catalyst polymerized ethylene at high rates (a $k_p$ of up to 9444 L/mmol·min was disclosed).

Finally, it has also been disclosed that a phosphinimide ligand which supports, along with a cyclopentadienyl ligand, a group 4 polymerization catalyst, can itself by substituted by a phosphinimide moiety, as shown in *Organometallics*, 2001, 20, 2303.

SUMMARY OF INVENTION

We now report that when a group 4 transition metal is ligated by two phosphinimide ligands, at least one of which bears further phosphinimide moieties, the molecular weight performance of this group of catalysts can be enhanced.

An embodiment of the disclosure is a phosphinimide pre-polymerization catalyst having the following structure:

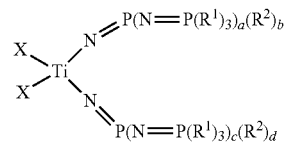

wherein P is phosphorus; N is nitrogen; each X is independently an activatable ligand; R$^1$ is independently selected from a hydrogen atom, a hydrocarbyl group which is unsubstituted or substituted with one or more halogen atom, an alkoxy group, an aryl group, an aryloxy group, an amido group, a silyl group, and a germanyl group; R$^2$ is independently a hydrocarbyl group which is unsubstituted or substituted with one or more halogen atom; a is 1, 2 or 3; b is 2, 1, or 0; a+b=3; c is 0, 1, 2 or 3; d is 3, 2, 1 or 0; and c+d=3.

In an embodiment of the disclosure, R$^1$ is independently a hydrocarbyl group which is unsubstituted or substituted with one or more halogen atom.

In an embodiment of the disclosure, R$^1$ is a tert-butyl group.

In an embodiment of the disclosure, R$^2$ is a tert-butyl group.

In an embodiment of the disclosure, each X is methide.

An embodiment of the disclosure is a polymerization catalyst system comprising: i) a phosphinimide pre-polymerization catalyst having the following structure:

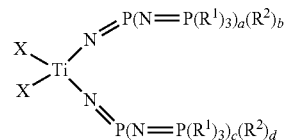

wherein P is phosphorus; N is nitrogen; each X is independently an activatable ligand; R$^1$ is independently selected from a hydrogen atom, a hydrocarbyl group which is unsubstituted or substituted with one or more halogen atom, an alkoxy group, an aryl group, an aryloxy group, an amido group, a silyl group, and a germanyl group; R$^2$ is independently a hydrocarbyl group which is unsubstituted or substituted with one or more halogen atom; a is 1, 2 or 3; b is 2, 1, or 0; a+b=3; c is 0, 1, 2 or 3; d is 3, 2, 1 or 0; and c+d=3; and ii) a catalyst activator. An embodiment of the disclosure is a polymerization process comprising polymerizing ethylene optionally with one or more C$_{3-12}$ alpha olefins in the presence of a polymerization catalyst system comprising: i) a phosphinimide pre-polymerization catalyst having the following structure:

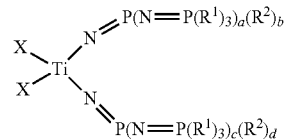

wherein P is phosphorus; N is nitrogen; each X is independently an activatable ligand; R$^1$ is independently selected from a hydrogen atom, a hydrocarbyl group which is unsubstituted or substituted with one or more halogen atom, an alkoxy group, an aryl group, an aryloxy group, an amido group, a silyl group, and a germanyl group; R$^2$ is independently a hydrocarbyl group which is unsubstituted or substituted with one or more halogen atom; a is 1, 2 or 3; b is 2, 1, or 0; a+b=3; c is 0, 1, 2 or 3; d is 3, 2, 1 or 0; and c+d=3; and ii) a catalyst activator selected from the group consisting of an ionic activator, an alkylaluminoxane and mixtures thereof.

In an embodiment of the disclosure, a polymerization process is a solution phase polymerization process carried out in a solvent.

In an embodiment of the disclosure, a polymerization process comprises polymerizing ethylene with one or more $C_{3-12}$ alpha olefins.

In an embodiment of the disclosure, a polymerization process comprises polymerizing ethylene with 1-octene.

DESCRIPTION OF EMBODIMENTS

The phosphinimide catalyst or complex described herein, usually requires activation by one or more cocatalytic or activator species in order to provide polymer from olefins. Hence, an un-activated phosphinimide complex may be described as a "pre-polymerization catalyst".

A phosphinimide catalyst is a compound (typically an organometallic compound) based on a group 3, 4 or 5 metal and which is characterized as having at least one phosphinimide ligand. Any compounds/complexes having a phosphinimide ligand and which display catalytic activity for ethylene (co)polymerization may be called "phosphinimide catalysts".

The phosphinimide catalyst employed in the present disclosure is one having two phosphinimide ligands, at least one of which is further substituted by a phosphinimide moiety.

The phosphinimide pre-polymerization catalyst may be used in combination with further catalyst components such as but not limited to one or more than one support, one or more than one catalyst activator and one or more than one catalyst modifier.

The phosphinimide pre-polymerization catalyst used in an embodiment of the disclosure is defined by the following structure:

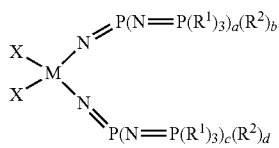

wherein M is Ti, Zr or Hf; P is phosphorus; N is nitrogen; each X is independently an activatable ligand; $R^1$ is independently selected from a hydrogen atom, a hydrocarbyl group which is unsubstituted or substituted with one or more halogen atom, an alkoxy group, an aryl group, an aryloxy group, an amido group, a silyl group, and a germanyl group; $R^2$ is independently a hydrocarbyl group which is unsubstituted or substituted with one or more halogen atom; a is 1, 2 or 3; b is 2, 1, or 0; a+b=3; c is 0, 1, 2 or 3; d is 3, 2, 1 or 0; and c+d=3.

The phosphinimide pre-polymerization catalyst used in an embodiment of the disclosure is defined by the following structure:

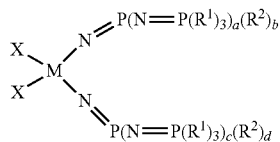

wherein M is Ti, Zr or Hf; P is phosphorus; N is nitrogen; each X is independently an activatable ligand; $R^1$ is independently selected from a hydrogen atom; a $C_{1-30}$ hydrocarbyl group which is unsubstituted or substituted with one or more halogen atom; a $C_{1-8}$ alkoxy group; a $C_{6-10}$ aryl group; a $C_{6-10}$ aryloxy group; an amido group of formula —N$(R^A)_2$, wherein the $R^A$ groups are independently selected from a hydrogen atom, a $C_{1-30}$ alkyl group, a $C_{6-10}$ aryl group; a silyl group of formula —Si$(R^S)_3$, wherein the $R^S$ groups are independently selected from a hydrogen atom, a $C_{1-8}$ alkyl or alkoxy group, a $C_{6-10}$ aryl group, a $C_{6-10}$ aryloxy group; or a germanyl group of formula —Ge$(R^G)_3$, wherein the $R^G$ groups are independently selected from, a hydrogen atom, a $C_{1-8}$ alkyl or alkoxy radical, a $C_{6-10}$ aryl radical, a $C_{6-10}$ aryloxy radical; $R^2$ is independently a $C_{1-30}$ hydrocarbyl group which is unsubstituted or substituted with one or more halogen atom; a is 1, 2 or 3; b is 2, 1, or 0; a+b=3; c is 0, 1, 2 or 3; d is 3, 2, 1 or 0; and c+d=3.

The phosphinimide pre-polymerization catalyst used in an embodiment of the disclosure is defined by the following structure:

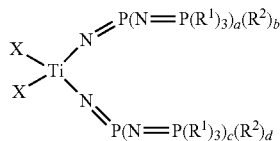

wherein P is phosphorus; N is nitrogen; each X is independently an activatable ligand; $R^1$ is independently selected from a hydrogen atom, a hydrocarbyl group which is unsubstituted or substituted with one or more halogen atom, an alkoxy group, an aryl group, an aryloxy group, an amido group, a silyl group, and a germanyl group; $R^2$ is independently a hydrocarbyl group which is unsubstituted or substituted with one or more halogen atom; a is 1, 2 or 3; b is 2, 1, or 0; a+b=3; c is 0, 1, 2 or 3; d is 3, 2, 1 or 0; and c+d=3.

The phosphinimide pre-polymerization catalyst used in an embodiment of the disclosure is defined by the following structure:

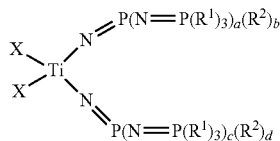

wherein P is phosphorus; N is nitrogen; each X is independently an activatable ligand; $R^1$ is independently selected from a hydrogen atom; a $C_{1-30}$ hydrocarbyl group which is unsubstituted or substituted with one or more halogen atom; a $C_{1-8}$ alkoxy group; a $C_{6-10}$ aryl group; a $C_{6-10}$ aryloxy group; an amido group of formula —N$(R^A)_2$, wherein the $R^A$ groups are independently selected from a hydrogen atom, a $C_{1-30}$ alkyl group, a $C_{6-10}$ aryl group; a silyl group of formula —Si($R^S$)$_3$, wherein the $R^S$ groups are independently selected from a hydrogen atom, a $C_{1-8}$ alkyl or alkoxy group, a $C_{6-10}$ aryl group, a $C_{6-10}$ aryloxy group; or a germanyl group of formula —Ge($R^G$)$_3$, wherein the $R^G$ groups are independently selected from, a hydrogen atom, a $C_{1-8}$ alkyl or alkoxy radical, a $C_{6-10}$ aryl radical, a $C_{6-10}$ aryloxy radical; $R^2$ is independently a $C_{1-30}$ hydrocarbyl group which is unsubstituted or substituted with one or more halogen atom; a is 1, 2 or 3; b is 2, 1, or 0; a+b=3; c is 0, 1, 2 or 3; d is 3, 2, 1 or 0; and c+d=3.

As used herein, the terms "hydrocarbyl", "hydrocarbyl radical" or "hydrocarbyl group" refers to linear or branched, aliphatic, olefinic, acetylenic and aryl (aromatic) radicals comprising hydrogen and carbon that are deficient by one hydrogen. The term "cyclic hydrocarbyl group" connotes hydrocarbyl groups that comprise cyclic moieties and which may have one or more than one cyclic aromatic ring, and/or one or more than one non-aromatic ring. The term "acyclic hydrocarbyl group" connotes hydrocarbyl groups that do not have cyclic moieties such as aromatic or non-aromatic ring structures present within them.

As used herein, the term "heteroatom" includes any atom other than carbon and hydrogen that can be bound to carbon. The term "heteroatom containing" or "heteroatom containing hydrocarbyl group" means that one or more than one non carbon atom(s) may be present in the hydrocarbyl groups. Some non-limiting examples of non-carbon atoms that may be present is a heteroatom containing hydrocarbyl group are N, O, S, P and Si as well as halides such as for example Br and metals such as Sn. Some non-limiting examples of heteroatom containing hydrocarbyl groups include for example imines, amine moieties, oxide moieties, phosphine moieties, ethers, ketones, heterocyclics, oxazolines, thioethers, and the like.

In an embodiment of the disclosure, a heteroatom containing hydrocarbyl group is a hydrocarbyl group containing from 1 to 3 atoms selected from the group consisting of boron, aluminum, silicon, germanium, nitrogen, phosphorous, oxygen and sulfur.

The terms "cyclic heteroatom containing hydrocarbyl" or "heterocyclic" refer to ring systems having a carbon backbone that further comprises at least one heteroatom selected from the group consisting of for example boron, aluminum, silicon, germanium, nitrogen, phosphorous, oxygen and sulfur.

In an embodiment of the disclosure, a cyclic heteroatom containing hydrocarbyl group is a cyclic hydrocarbyl group containing from 1 to 3 atoms selected from the group consisting of boron, aluminum, silicon, germanium, nitrogen, phosphorous, oxygen and sulfur.

As used herein, an "alkyl radical" or "alkyl group" includes linear, branched and cyclic paraffin radicals that are deficient by one hydrogen radical; non-limiting examples include methyl (—CH$_3$) and ethyl (—CH$_2$CH$_3$) radicals. The term "alkenyl radical" or "alkenyl group" refers to linear, branched and cyclic hydrocarbons containing at least one carbon-carbon double bond that is deficient by one hydrogen radical. The term "alkynyl radical" or "alkynyl group" refers to linear, branched and cyclic hydrocarbons containing at least one carbon-carbon triple bond that is deficient by one hydrogen radical.

As used herein, the term "aryl" group includes phenyl, naphthyl, pyridyl and other radicals whose molecules have an aromatic ring structure; non-limiting examples include naphthylene, phenanthrene and anthracene. An "alkylaryl" group is an alkyl group having an aryl group pendant there from; non-limiting examples include benzyl, phenethyl and tolylmethyl. An "arylalkyl" is an aryl group having one or more alkyl groups pendant there from; non-limiting examples include tolyl, xylyl, mesityl and cumyl.

An "alkoxy" group is an oxy group having an alkyl group pendant there from; and includes for example a methoxy group, an ethoxy group, an iso-propoxy group, and the like.

An "aryloxy" group is an oxy group having an aryl group pendant there from; and includes for example a phenoxy group and the like.

As used herein the term "unsubstituted" means that hydrogen radicals are bounded to the molecular group that is referred to by the term unsubstituted. The term "substituted" means that the group referred to by this term possesses one or more moieties that have replaced one or more hydrogen radicals in any position within the group; non-limiting examples of moieties include halogen radicals (F, Cl, Br), an alkyl group, an alkylaryl group, an arylalkyl group, an alkoxy group, an aryl group, an aryloxy group, an amido group, a silyl group or a germanyl group, hydroxyl groups, carbonyl groups, carboxyl groups, amine groups, phosphine groups, phenyl groups, naphthyl groups, $C_1$ to $C_{10}$ alkyl groups, $C_2$ to $C_{10}$ alkenyl groups, and combinations thereof.

In an embodiment of the disclosure, M is titanium, Ti.

In an embodiment of the disclosure, $R^1$ is a hydrocarbyl group which is unsubstituted or substituted with one or more halogen atom.

In an embodiment of the disclosure, $R^1$ is an alkyl group.

In an embodiment of the disclosure, $R^1$ is an aryl group.

In an embodiment of the disclosure, $R^1$ is a tert-butyl group.

In an embodiment of the disclosure, $R^1$ is an iso-propyl group.

In an embodiment of the disclosure, $R^1$ is a phenyl group.

In an embodiment of the disclosure, $R^1$ is a hydrogen atom.

In an embodiment of the disclosure, $R^2$ is a hydrocarbyl group which is unsubstituted or substituted with one or more halogen atom.

In an embodiment of the disclosure, $R^2$ is an alkyl group.

In an embodiment of the disclosure, $R^2$ is an aryl group.

In an embodiment of the disclosure, $R^2$ is a phenyl group.

In an embodiment of the disclosure, $R^2$ is a tert-butyl group.

In an embodiment of the disclosure, $R^2$ is an isopropyl group.

In an embodiment of the disclosure, $R^2$ is a hydrogen atom.

In an embodiment of the disclosure, a is 1, b is 2, c is 0 and d is 3.

In an embodiment of the disclosure, a is 1, b is 2, c is 1 and d is 2.

In the current disclosure, the term "activatable", means that the ligand X may be cleaved from the metal center M via a protonolysis reaction or abstracted from the metal center M by suitable acidic or electrophilic catalyst activator compounds (also known as "co-catalyst" compounds) respectively, examples of which are described below. The activatable ligand X may also be transformed into another ligand which is cleaved or abstracted from the metal center M (e.g. a halide may be converted to an alkyl group). Without wishing to be bound by any single theory, protonolysis or abstraction reactions generate an active "cationic" metal center which can polymerize olefins.

In embodiments of the present disclosure, the activatable ligand, X is independently selected from the group consisting of a hydrogen atom; a halogen atom, a $C_{1-10}$ hydrocarbyl radical; a $C_{1-10}$ alkoxy radical; and a $C_{6-10}$ aryl or aryloxy radical, where each of the hydrocarbyl, alkoxy, aryl, or aryl oxide radicals may be un-substituted or further substituted by one or more halogen or other group; a $C_{1-8}$ alkyl; a $C_{1-8}$ alkoxy, a $C_{6-10}$ aryl or aryloxy; an amido or a phosphido radical, but where X is not a cyclopentadienyl. Two X ligands may also be joined to one another and form for example, a substituted or unsubstituted diene ligand (i.e. 1,3-butadiene); or a delocalized heteroatom containing group such as an acetate or acetamidinate group. In a convenient embodiment of the disclosure, each X is independently selected from the group consisting of a halide atom, a $C_{1-4}$ alkyl radical and a benzyl radical.

In an embodiment, particularly suitable activatable ligands are monoanionic such as a halide (e.g. chloride) or a hydrocarbyl (e.g. methyl, benzyl).

The catalyst activator (or simply the "activator" for short) used to activate the phosphinimide catalyst can be any suitable activator including one or more activators selected from the group consisting of alkylaluminoxanes and ionic activators, optionally together with an alkylating agent.

Without wishing to be bound by theory, alkylaluminoxanes are thought to be complex aluminum compounds of the formula: $R^3_2Al^1O(R^3Al^1O)_mAl^1R^3_2$, wherein each $R^3$ is independently selected from the group consisting of $C_{1-20}$ hydrocarbyl radicals and m is from 3 to 50. Optionally a hindered phenol can be added to the alkylaluminoxane to provide a molar ratio of $Al^1$:hindered phenol of from 2:1 to 5:1 when the hindered phenol is present.

In an embodiment of the disclosure, $R^3$ of the alkylaluminoxane, is a methyl radical and m is from 10 to 40.

The alkylaluminoxanes are typically used in substantial molar excess compared to the amount of group 4 transition metal in the phosphinimide compound/complex. The $Al^1$:group 4 transition metal molar ratios may be from about 10:1 to about 10,000:1, preferably from about 30:1 to about 500:1.

In an embodiment of the disclosure, the catalyst activator comprises methylaluminoxane (MAO).

In an embodiment of the disclosure, the catalyst activator comprises modified methylaluminoxane (MMAO).

It is well known in the art, that the alkylaluminoxane can serve dual roles as both an alkylator and an activator. Hence, an alkylaluminoxane activator is often used in combination with activatable ligands such as halogens.

Alternatively, the catalyst activator of the present disclosure may be a combination of an alkylating agent (which may also serve as a scavenger) with an activator capable of ionizing the group 4 of the transition metal catalyst (i.e. an ionic activator). In this context, the activator can be chosen from one or more alkylaluminoxane and/or an ionic activator, since an alkylaluminoxane may serve as both an activator and an alkylating agent.

When present, the alkylating agent may be selected from the group consisting of $(R^4)_pMgX^2_{2-p}$ wherein $X^2$ is a halide and each $R^4$ is independently selected from the group consisting of $C_{1-10}$ alkyl radicals and p is 1 or 2; $R^4Li$ wherein in $R^4$ is as defined above, $(R^4)_qZnX^2_{2-q}$ wherein $R^4$ is as defined above, $X^2$ is halogen and q is 1 or 2; and $(R^4)_sAl^2X^2_{3-s}$ wherein $R^4$ is as defined above, $X^2$ is halogen and s is an integer from 1 to 3. Preferably in the above compounds $R^4$ is a $C_{1-4}$ alkyl radical, and $X^2$ is chlorine. Commercially available compounds include triethyl aluminum (TEAL), trimethylaluminum, triisobutyl aluminum, tributyl aluminum, diethyl aluminum chloride (DEAC), dibutyl magnesium ($(Bu)_2Mg$), and butyl ethyl magnesium (BuEtMg or BuMgEt). Alkylaluminoxanes can also be used as alkylating agents.

The ionic activator may be selected from the group consisting of: (i) compounds of the formula $[R^5]^+[B(R^6)_4]^-$ wherein B is a boron atom, $R^5$ is a cyclic $C_{5-7}$ aromatic cation or a triphenyl methyl cation and each $R^6$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula $-Si-(R^7)_3$; wherein each $R^7$ is independently selected from the group consisting of a hydrogen atom and a $C_{1-4}$ alkyl radical; and (ii) compounds of the formula $[(R^8)_tZH]^+[B(R^6)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^6$ is as defined above; and (iii) compounds of the formula $B(R^6)_3$ wherein $R^6$ is as defined above.

In the above compounds preferably $R^6$ is a pentafluorophenyl radical, and $R^5$ is a triphenylmethyl cation, Z is a nitrogen atom and $R^8$ is a $C_{1-4}$ alkyl radical or $R^8$ taken together with the nitrogen atom forms an anilinium radical which is substituted by two $C_{1-4}$ alkyl radicals.

Examples of compounds capable of ionizing the phosphinimide catalyst include the following compounds: triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra (o,p-dimethylphenyl)boron, tributylammonium tetra(m,m-dimethylphenyl)boron, tributylammonium tetra(p-trifluoromethylphenyl)boron, tributylammonium tetra (pentafluorophenyl)boron, tri(n-butyl)ammonium tetra (o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra (phenyl)boron, triphenylphosphonium tetra)phenyl)boron, tri(methylphenyl)phosphonium tetra(phenyl)boron, tri (dimethylphenyl)phosphonium tetra(phenyl)boron, tropillium tetrakispentafluorophenyl borate, triphenylmethylium tetrakispentafluorophenyl borate, benzene (diazonium) tetrakispentafluorophenyl borate, tropillium phenyl-trispentafluorophenyl borate, triphenylmethylium phenyl-trispentafluorophenyl borate, benzene (diazonium) phenyltrispentafluorophenyl borate, tropillium tetrakis (2,3, 5,6-tetrafluorophenyl) borate, triphenylmethylium tetrakis (2,3,5,6-tetrafluorophenyl) borate, benzene (diazonium) tetrakis (3,4,5-trifluorophenyl) borate, tropillium tetrakis (3,4, 5-trifluorophenyl) borate, benzene (diazonium) tetrakis (3,4, 5-trifluorophenyl) borate, tropillium tetrakis (1,2,2-trifluoroethenyl) borate, trophenylmethylium tetrakis (1,2, 2-trifluoroethenyl) borate, benzene (diazonium) tetrakis (1,2,2-trifluoroethenyl) borate, tropillium tetrakis (2,3,4,5-tetrafluorophenyl) borate, triphenylmethylium tetrakis (2,3, 4,5-tetrafluorophenyl) borate, and benzene (diazonium) tetrakis (2,3,4,5-tetrafluorophenyl) borate.

Commercially available activators which are capable of ionizing the phosphinimide catalyst include: N,N-dimethylaniliniumtetrakispentafluorophenyl borate ("[Me$_2$NHPh][B ("$C_6F_5)_4$]"); triphenylmethylium tetrakispentafluorophenyl borate ("[$Ph_3C$][$B(C_6F_5)_4$]"); and trispentafluorophenyl boron.

In an embodiment of the disclosure, the ionic activator compounds may be used in amounts which provide a molar ratio of group 4 transition metal to boron that will be from 1:1 to 1:6.

Optionally, mixtures of alkylaluminoxanes and ionic activators can be used as activators for the phosphinimide pre-polymerization catalyst.

The phosphinimide pre-polymerization catalysts of the present disclosure may be used in any conventional olefin polymerization process, such as gas phase polymerization, slurry phase polymerization or solution phase polymerization. The use of a "heterogeneized" catalyst system is preferred for use in gas phase and slurry phase polymerization while a homogeneous catalyst is preferred for us in a solution phase polymerization. A heterogenized catalyst system may be formed by supporting a pre-polymerization catalyst, optionally along with an activator on a support, such as for example, a silica support, as is well known to persons skilled in the art.

Solution polymerization processes for the polymerization or copolymerization of ethylene are well known in the art (see for example U.S. Pat. Nos. 6,372,864 and 6,777,509). These processes are conducted in the presence of an inert hydrocarbon solvent, typically, a $C_{5-12}$ hydrocarbon which may be unsubstituted or substituted by $C_{1-4}$ alkyl group such as pentane, methyl pentane, hexane, heptane, octane, cyclohexane, methylcyclohexane and hydrogenated naphtha. An example of a suitable solvent which is commercially available is "Isopar E" ($C_{8-12}$ aliphatic solvent, Exxon Chemical Co.).

The polymerization temperature in a conventional solution process is from about 80° C. to about 300° C. In an embodiment of the disclosure the polymerization temperature in a solution process if from about 120° C. to about 250° C. The polymerization pressure in a solution process may be a "medium pressure process", meaning that the pressure in the reactor is less than about 6,000 psi (about 42,000 kiloPascals or kPa). In an embodiment of the disclosure, the polymerization pressure in a solution process may be from about 10,000 to about 40,000 kPa, or from about 14,000 to about 22,000 kPa (i.e. from about 2,000 psi to about 3,000 psi).

Suitable monomers for copolymerization with ethylene include $C_{3-20}$ mono- and di-olefins. Preferred comonomers include $C_{3-12}$ alpha olefins which are unsubstituted or substituted by up to two $C_{1-6}$ alkyl radicals, $C_{8-12}$ vinyl aromatic monomers which are unsubstituted or substituted by up to two substituents selected from the group consisting of $C_{1-4}$ alkyl radicals, $C_{4-12}$ straight chained or cyclic diolefins which are unsubstituted or substituted by a $C_{1-4}$ alkyl radical. Illustrative non-limiting examples of such alpha-olefins are one or more of propylene, 1-butene, 1-pentene, 1-hexene, 1-octene and 1-decene, styrene, alpha methyl styrene, and the constrained-ring cyclic olefins such as cyclobutene, cyclopentene, dicyclopentadiene norbornene, alkyl-substituted norbornenes, alkenyl-substituted norbornenes and the like (e.g. 5-methylene-2-norbornene and 5-ethylidene-2-norbornene, bicyclo-(2,2,1)-hepta-2,5-diene).

In an embodiment, the polyethylene polymers which may be prepared in accordance with the present disclosure are LLDPE's which typically comprise not less than 60, preferably not less than 75 weight % of ethylene and the balance one or more $C_{4-10}$ alpha olefins, preferably selected from the group consisting of 1-butene, 1-hexene and 1-octene. The polyethylene prepared in accordance with the present disclosure may be LLDPE having a density from about 0.910 to 0.935 g/cm³ or (linear) high density polyethylene having a density above 0.935 g/cm³.

The present disclosure might also be useful to prepare polyethylene having a density below 0.910 g/cm³—the so-called very low and ultra-low density polyethylenes.

Generally, the alpha olefin may be present in an amount from about 3 to 30 weight %, preferably from about 4 to 25 weight %.

The present disclosure may also be used to prepare co- and ter-polymers of ethylene, propylene and optionally one or more diene monomers. Generally, such polymers will contain about 50 to about 75 weight % ethylene, preferably about 50 to 60 weight % ethylene and correspondingly from 50 to 25 weight % of propylene. A portion of the monomers, typically the propylene monomer, may be replaced by a conjugated diolefin. The diolefin may be present in amounts up to 10 weight % of the polymer although typically is present in amounts from about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene, especially 5-ethylidene-2-norbornene and 1,4-hexadiene.

In solution polymerization, the monomers are dissolved/dispersed in the solvent either prior to being fed to the reactor (or for gaseous monomers the monomer may be fed to the reactor so that it will dissolve in the reaction mixture). Prior to mixing, the solvent and monomers are generally purified to remove potential catalyst poisons such as water, oxygen or metal impurities. The feedstock purification follows standard practices in the art, e.g. molecular sieves, alumina beds and oxygen removal catalysts are used for the purification of monomers. The solvent itself as well (e.g. methyl pentane, cyclohexane, hexane or toluene) is preferably treated in a similar manner.

The feedstock may be heated or cooled prior to feeding to the reactor.

Generally, the catalyst components (the phosphinimide pre-polymerization catalyst, an ionic activator and optionally an alkylaluminoxane) may be premixed in the solvent for the reaction or fed as separate streams to the reactor. In some instances premixing it may be desirable to provide a reaction time for the catalyst components prior to entering the reaction. Such an "in line mixing" technique is described in a number of patents in the name of DuPont Canada Inc. (e.g. U.S. Pat. No. 5,589,555 issued Dec. 31, 1996).

An embodiment of the disclosure is a polymerization process comprising polymerizing ethylene optionally with one or more $C_{3-12}$ alpha olefins in the presence of a polymerization catalyst system comprising:
  i) a phosphinimide pre-polymerization catalyst having the following structure:

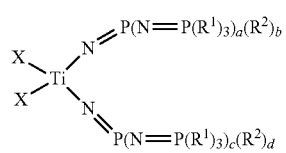

wherein P is phosphorus; N is nitrogen; each X is independently an activatable ligand; $R^1$ is independently selected from a hydrogen atom, a hydrocarbyl group which is unsubstituted or substituted with one or more halogen atom, an alkoxy group, an aryl group, an aryloxy group, an amido group, a silyl group, and a germanyl group; $R^2$ is independently a hydrocarbyl group which is unsubstituted or substituted with one or more halogen atom; a is 1, 2 or 3; b is 2, 1, or 0; a+b=3; c is 0, 1, 2 or 3; d is 3, 2, 1 or 0; and c+d=3; and ii) a catalyst activator.

An embodiment of the disclosure is a polymerization process comprising polymerizing ethylene optionally with one or more $C_{3-12}$ alpha olefins in the presence of a polymerization catalyst system comprising:
i) a phosphinimide pre-polymerization catalyst having the following structure:

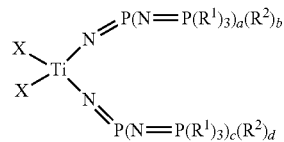

wherein P is phosphorus; N is nitrogen; each X is independently an activatable ligand; $R^1$ is independently selected from a hydrogen atom; a $C_{1-30}$ hydrocarbyl group which is unsubstituted or substituted with one or more halogen atom; a $C_{1-8}$ alkoxy group; a $C_{6-10}$ aryl group; a $C_{6-10}$ aryloxy group; an amido group of formula —$N(R^A)_2$, wherein the $R^A$ groups are independently selected from a hydrogen atom, a $C_{1-30}$ alkyl group, a $C_{6-10}$ aryl group; a silyl group of formula —$Si(R^S)_3$, wherein the $R^S$ groups are independently selected from a hydrogen atom, a $C_{1-8}$ alkyl or alkoxy group, a $C_{6-10}$ aryl group, a $C_{6-10}$ aryloxy group; or a germanyl group of formula —$Ge(R^G)_3$, wherein the $R^G$ groups are independently selected from, a hydrogen atom, a $C_{1-8}$ alkyl or alkoxy radical, a $C_{6-10}$ aryl radical, a $C_{6-10}$ aryloxy radical; $R^2$ is independently a $C_{1-30}$ hydrocarbyl group which is unsubstituted or substituted with one or more halogen atom; a is 1, 2 or 3; b is 2, 1, or 0; a+b=3; c is 0, 1, 2 or 3; d is 3, 2, 1 or 0; and c+d=3; and ii) a catalyst activator.

An embodiment of the disclosure is a polymerization process comprising polymerizing ethylene optionally with one or more $C_{3-12}$ alpha olefins in the presence of a polymerization catalyst system comprising:
i) a phosphinimide pre-polymerization catalyst used in an embodiment of the disclosure is defined by the following structure:

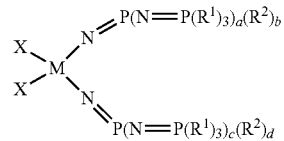

wherein M is Ti, Zr or Hf; P is phosphorus; N is nitrogen; each X is independently an activatable ligand; $R^1$ is independently selected from a hydrogen atom, a hydrocarbyl group which is unsubstituted or substituted with one or more halogen atom, an alkoxy group, an aryl group, an aryloxy group, an amido group, a silyl group, and a germanyl group; $R^2$ is independently a hydrocarbyl group which is unsubstituted or substituted with one or more halogen atom; a is 1, 2 or 3; b is 2, 1, or 0; a+b=3; c is 0, 1, 2 or 3; d is 3, 2, 1 or 0; and c+d=3; and ii) a catalyst activator.

An embodiment of the disclosure is a polymerization process comprising polymerizing ethylene optionally with one or more $C_{3-12}$ alpha olefins in the presence of a polymerization catalyst system comprising:
i) a phosphinimide pre-polymerization catalyst used in an embodiment of the disclosure is defined by the following structure:

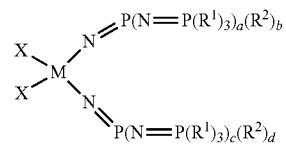

wherein M is Ti, Zr or Hf; P is phosphorus; N is nitrogen; each X is independently an activatable ligand; $R^1$ is independently selected from a hydrogen atom; a $C_{1-30}$ hydrocarbyl group which is unsubstituted or substituted with one or more halogen atom; a $C_{1-8}$ alkoxy group; a $C_{6-10}$ aryl group; a $C_{6-10}$ aryloxy group; an amido group of formula —$N(R^A)_2$, wherein the $R^A$ groups are independently selected from a hydrogen atom, a $C_{1-30}$ alkyl group, a $C_{6-10}$ aryl group; a silyl group of formula —$Si(R^S)_3$, wherein the $R^S$ groups are independently selected from a hydrogen atom, a $C_{1-8}$ alkyl or alkoxy group, a $C_{6-10}$ aryl group, a $C_{6-10}$ aryloxy group; or a germanyl group of formula —$Ge(R^G)_3$, wherein the $R^G$ groups are independently selected from, a hydrogen atom, a $C_{1-8}$ alkyl or alkoxy radical, a $C_{6-10}$ aryl radical, a $C_{6-10}$ aryloxy radical; $R^2$ is independently a $C_{1-30}$ hydrocarbyl group which is unsubstituted or substituted with one or more halogen atom; a is 1, 2 or 3; b is 2, 1, or 0; a+b=3; c is 0, 1, 2 or 3; d is 3, 2, 1 or 0; and c+d=3; and ii) a catalyst activator.

In an embodiment of the disclosure, the polymerization process is a solution phase polymerization process carried out in a solvent.

In an embodiment of the disclosure, the polymerization process comprises polymerizing ethylene with one or more $C_{3-12}$ alpha olefins.

In an embodiment of the disclosure, the polymerization process comprises polymerizing ethylene with 1-octene.

EXAMPLES

General Experimental Methods

All reactions were conducted under nitrogen using standard Schlenk techniques or in an inert atmosphere glovebox. Reaction solvents were purified using the system described by Grubbs et al. (see: Pangborn, A. B.; Giardello, M. A.; Grubbs, R. H.; Rosen R. K.; Timmers, F. J. *Organometallics* 1996, 15, 1518-1520) and then stored over activated molecular sieves in an inert atmosphere glovebox. Methylmagnesium bromide solution, di-tert-butylchlorophosphine, isopropyldichlorophosphine, copper(I) bromide dimethyl sulfide complex, trimethylsilyl azide, tetrabenzylhafnium (IV), tetrabenzylzirconium(IV), CpTiCl₃, CuI and KOH were purchased from Aldrich and used as it is. 13× molecular sieves were purchased from Grace and activated at 260° C. overnight. LiBr was dried at 150° C. overnight under vacuum. 2,6-di-tert-butyl-4-ethylphenol (BHEB), and azidotrimethylsilane were purchased from Aldrich and used as received. MMAO-7 (7 wt % solution in Isopar-E) was purchase from Akzo Nobel and used as received. Triphenylcarbenium tetrakis(pentafluorophenyl)borate was purchased from Albemarle Corp. and used as received. Deuterated NMR solvents, toluene-$d_8$ and dichloromethane-$d_2$, were purchased from Aldrich and stored over 13× molecular sieves prior to use. NMR spectra were recorded on a Bruker 400 MHz spectrometer ($^1$H: 400.1 MHz, $^{31}$P: 162 MHz).

Molecular weight information ($M_w$, $M_n$ and $M_z$ in g/mol) and molecular weight distribution ($M_w/M_n$), and z-average molecular weight distribution ($M_z/M_w$) were analyzed by gel permeation chromatography (GPC), using an instrument sold under the trade name "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("Mn") and 5.0% for the weight average molecular weight ("Mw"). Polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 mL. The raw data were processed with CIRRUS® GPC software. The columns were calibrated with narrow distribution polystyrene standards. The polystyrene molecular weights were converted to polyethylene molecular weights using the Mark-Houwink equation, as described in the ASTM standard test method D6474.

The branch frequency of copolymer samples (i.e. the short chain branching, SCB per 1000 backbone carbon atoms) and the $C_8$ comonomer content (in wt %) was determined by Fourier Transform Infrared Spectroscopy (FTIR) as per the ASTM D6645-01 method. A Thermo-Nicolet 750 Magna-IR Spectrophotometer equipped with OMNIC® version 7.2a software was used for the measurements.

The determination of branch frequency as a function of molecular weight (and hence the comonomer distribution) was carried out using high temperature Gel Permeation Chromatography (GPC) and FT-IR of the eluent. Polyethylene standards with a known branch content, polystyrene and hydrocarbons with a known molecular weight were used for calibration.

Example 1

The general synthetic steps and methods employed to make the phosphinimide pre-catalyst of Example 1, dimethyl bis[(di-tert-butyl(phosphinimide)phosphinimide]titanium are provided below.

Synthesis of Lithium tri-tert-butylphosphinimide

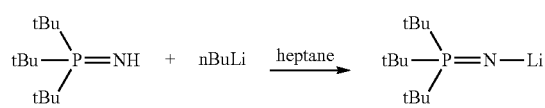

Tri-tert-butylphosphinimine (40.5 g, 186.34 mmol) was dissolved in a minimum amount of heptane at room temperature, and then nBuLi (120 mL, 192 mmol) was added dropwise. The mixture was stirred overnight, and the precipitate was filtered and washed with heptane (3×20 mL). After being dried in vacuo, the white solid was collected and stored in a −35° C. freezer. Yield: 32.3 g, 78%. $^{31}$P{$^1$H} (THF-ds): δ 31.0. $^1$H NMR (THF-ds): δ 1.31 (d).

Synthesis of (tri-tert-butylphosphiniminol(di-tert-butyl)phosohine

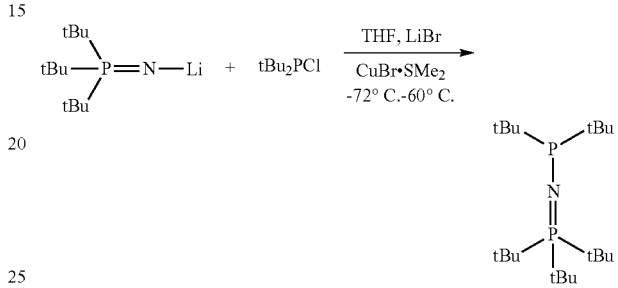

A mixture of CuBr·SMe$_2$ (0.5 g, 2.43 mmol), LiBr (1 g, 11.51 mmol), and lithium tri-tert-butylphosphinimide (10.5 g, 40.74 mmol) was suspended in THF (100 mL) and cooled to −72° C. with a dry ice/ethanol bath. A solution of ClP$^t$Bu$_2$ (8.5 g, 47.05 mmol) in heptane (10 mL) was added dropwise. The reaction was stirred overnight, slowly warmed up to room temperature and then heated at 60° C. for ten days. All the volatiles were removed under vacuum, and the solid was extracted with hot toluene (90° C.) (3×100 mL). After being filtered through Celite, all toluene was removed, and the product was recrystallized out from a minimum amount of hot heptane (100° C.) solution overnight. Yield: 9 g, 53%. $^{31}$P{$^1$H} (toluene-$d_8$): δ 90.6 (d), 39.3 (d). $^1$H NMR (toluene-$d_8$): δ 1.36 (d, 18H), 1.32 (d, 27H).

Synthesis of Trimethylsilyl-(Tri-Tert-Butylphosphinimino)(Di-Tert-Butyl)Phosphinimine

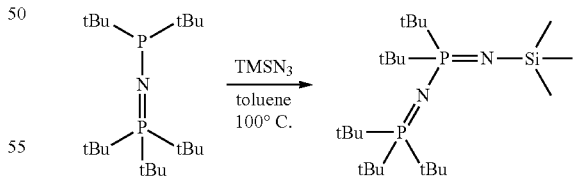

(Tri-tert-butylphosphinimino)(di-tert-butyl)phosphine (2 g, 5.53 mmol) and trimethylsilyl azide (0.87 g, 1 mL, 8.29 mmol) was mixed in toluene (30 mL) and heated up to 60° C. The second portion of trimethylsilyl azide (0.87 g, 1 mL, 8.29 mmol) was added after one hour at 60° C. The reaction was then heated at 100° C. overnight, all volatiles were removed in vacuo to give a white solid. Yield: 2.48 g, 100%. $^{31}$P{$^1$H} (CD$_2$Cl$_2$): δ 40.4 (d), 18.9 (d). $^1$H NMR (CD$_2$Cl$_2$): δ 1.37 (d, 18H), 1.27 (d, 27H), 0.38 (s, 9H).

Synthesis of (tri-tert-butylphosphinimino)(di-tert-butyl)phosphinimine

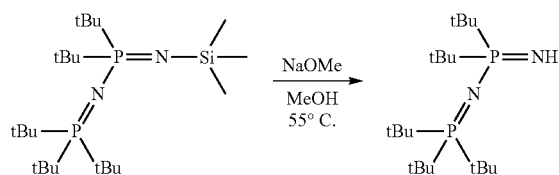 [SMILES: CC(C)(C)P(=N[Si](C)(C)C)(N=P(C(C)(C)C)(C(C)(C)C)C(C)(C)C)C(C)(C)C ; CC(C)(C)P(=N)(N=P(C(C)(C)C)(C(C)(C)C)C(C)(C)C)C(C)(C)C ; "NaOMe"]

Sodium metal (ca. 0.2 g) was dissolved in degassed methanol (200 mL). This solution was then added into a flask containing trimethylsilyl-(tri-tert-butylphosphinimino)(di-tert-butyl)phosphinimine (8.5 g, 18.94 mmol). The mixture was heated at 55° C. overnight. All volatiles were removed in vacuo. The product was extracted with toluene (3×50 mL) and filtered through a pad of Celite. A white solid was obtained after all solvent was removed. Yield: 6.85 g, 96%. $^{31}P\{1H\}$ (CD$_2$Cl$_2$): δ 45.6 (d), 42.4 (d). $^1$H NMR (CD$_2$Cl$_2$): δ 1.50 (d, 27H), 1.29 (d, 18H).

Synthesis of trimethyl[(tri-tert-butylphosphinimino)(di-tert-butyl)phosphinimide]titanium

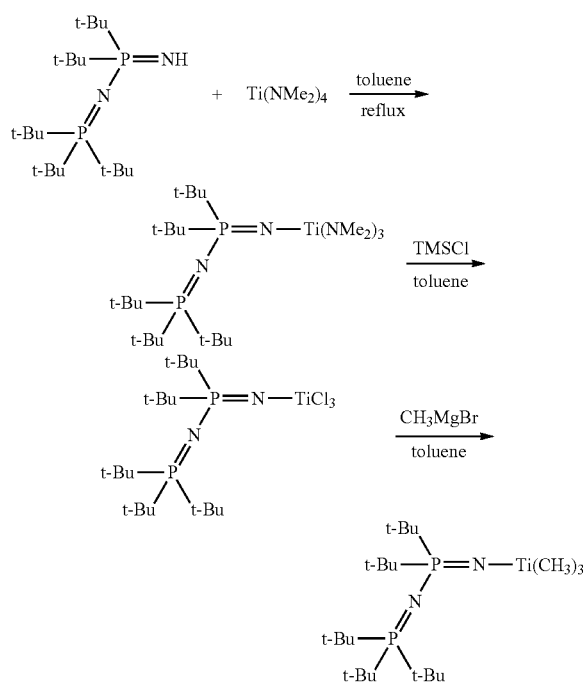

(Tri-tert-butylphosphinimino)(di-tert-butyl)phosphinimine (2.35 g, 6.24 mmol), and tetrakis(dimethylamido)titanium (1.40 g, 6.24 mmol) were mixed in toluene (50 mL) and heated to reflux overnight. After all volatiles were removed under vacuum, the product was re-dissolved in toluene (50 mL). TMSCl (2.10 g, 19.33 mmol) was added. The mixture was stirred overnight, and then dried in vacuo. The white solid was then re-dissolved in toluene (50 mL) again. CH$_3$MgBr (15 mL, 45 mmol, 3M in diethyl ether) was added. After the mixture was stirred overnight again, all volatiles were removed. The product was extracted with toluene (3×30 mL) and filtered through a pad of Celite. After being recrystallized from toluene/heptane mixture, a white solid was obtained. Yield: 1.50 g, 51%. $^{31}P\{^1H\}$ (CD$_2$Cl$_2$): δ 45.2 (d), 12.4 (d). $^1$H NMR (CD$_2$Cl$_2$): δ 1.47 (d, 18H), 1.26 (d, 27H), 1.02 (s, 9H).

Synthesis of dimethyl bisRtri-tert-butylphosphinimino)(di-tert-butyl)phosphinimideItitanium

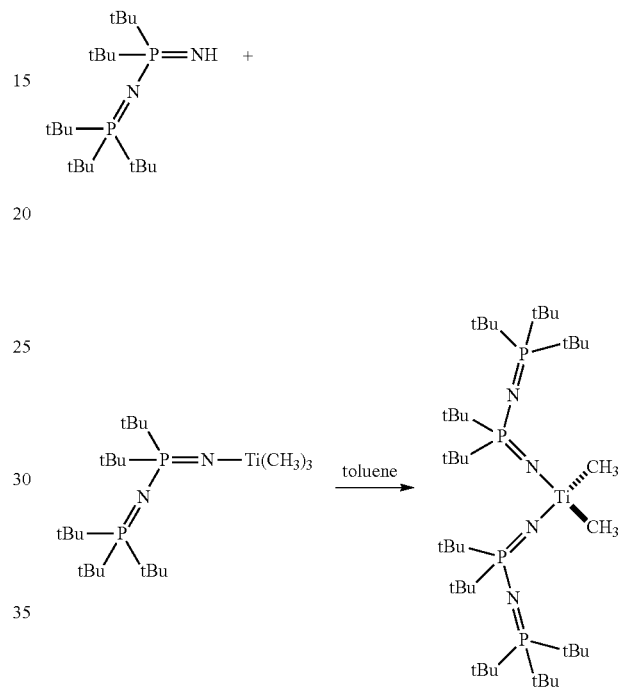

To a solution of trimethyl[(tri-tert-butylphosphinimino)(di-tert-butyl)phosphinimide]titanium (1.50 g, 3.20 mmol) in toluene (25 mL), (tri-tert-butylphosphinimino)(di-tert-butyl)phosphinimine (1.20 g, 3.19 mmol) in toluene (15 mL) was added dropwise over half hour. The mixture was then stirred overnight at room temperature. All volatiles were then removed in vacuo. The product was crystallized from a mixture of toluene/pentane solution at −35° C. Yield: 1.40 g, 53%. $^{31}P\{^1H\}$ (CD$_2$Cl$_2$): δ 40.4 (d), 8.4 (d). $^1$H NMR (CD$_2$Cl$_2$): δ 2.09 (d, 36H), 1.40 (d, 54H), 0.67 (s, 6H).

Example 2

Synthesis of dimethyl {(tri-tert-butylphosphinimide)[(tri-tert-butylphosphinimino)(di-tert-butyl)phosphinimide]}titanium

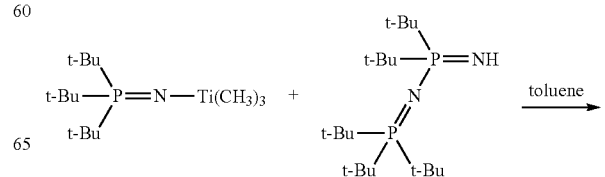

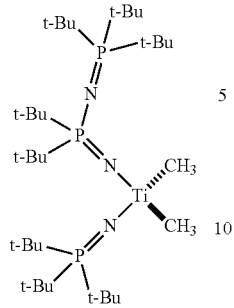

To a solution of trimethyl(tri-tert-butylphosphinimide) titanium (2.93 mmol) in toluene (50 mL), (tri-tert-butylphosphinimino)(di-tert-butyl)phosphinimine (1.10 g, 2.92 mmol) in toluene (15 mL) was added dropwise over half hour. The mixture was then stirred for 1 hour at room temperature. All volatiles were then removed in vacuo. The yellow tar was dissolved in pentane (50 mL) and evaporated to yield the product as an off-white powder. Yield: 1.65 g, 83%. $^{31}P\{^1H\}$ (toluene-$d_8$): δ 42.2 (d), 24.1 (d), 9.6 (s). $^1H$ NMR (toluene-$d_8$): δ 1.54 (d, 18H), 1.40 (d, 54H), 0.66 (s, 6H).

Example 3

Synthesis of dibenzyl bis[(tri-tert-butylphosphinimino)(di-tert-butyl)phosphinimide]zirconium

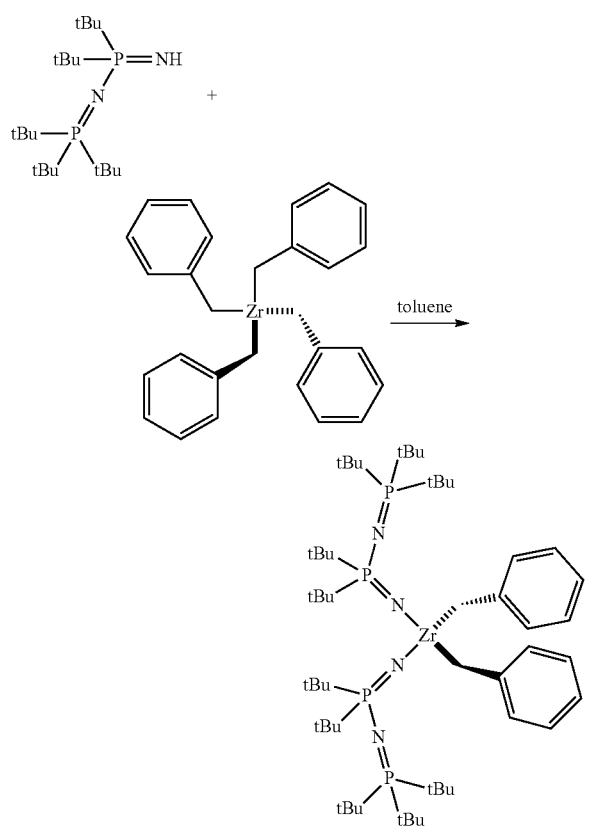

To a solution of tetrabenzylzirconium(IV) (0.91 g, 2 mmol) in toluene (25 mL), (tri-tert-butylphosphinimino)(di-tert-butyl)phosphinimine (1.51 g, 4 mmol) in toluene (25 mL) was added dropwise over half hour. The mixture was then stirred overnight at room temperature. All volatiles were then removed in vacuo. The product was crystallized from a mixture of toluene/pentane solution at −35° C. Yield: 0.873 g, 43%. $^{31}P\{^1H\}$ (toluene-$d_8$): δ 39.98 (d), 16.0 (d). $^1H$ NMR (toluene-$d_8$): δ 7.19 (m, 8H), 6.85 (m, 2H), 2.46 (s, 4H), 1.45 (d, 36H), 1.32 (d, 54H).

Example 4

Synthesis of dibenzyl bis[(tri-tert-butylphosphinimino)(di-tert-butyl)phosphinimide]hafnium

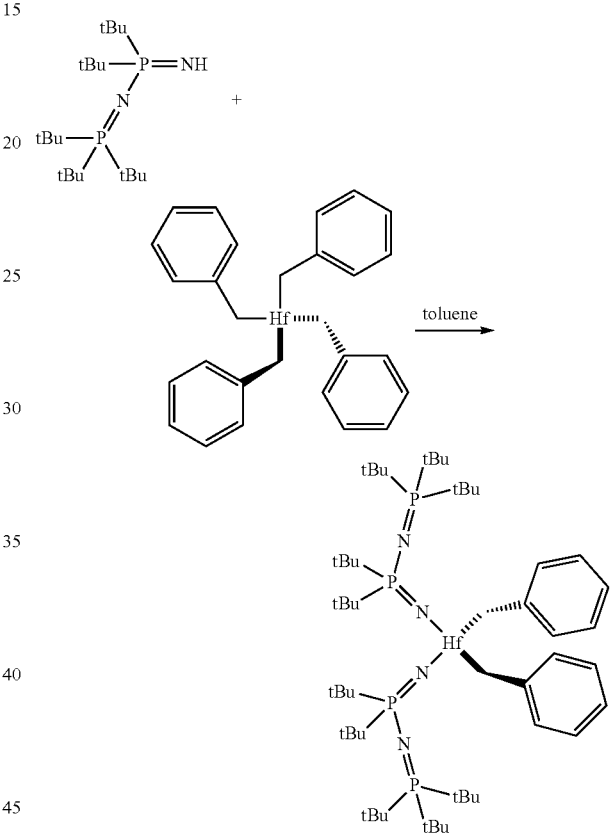

To a solution of tetrabenzylhafnium(IV) (1.09 g, 2 mmol) in toluene (25 mL), di-tert-butyl(phosphinimino)phosphinimine (1.51 g, 4 mmol) in toluene (25 mL) was added dropwise over half an hour. The mixture was then stirred overnight at room temperature. All volatiles were then removed in vacuo. The product was crystallized from a mixture of toluene/pentane solution at −35° C. Yield: 0.87 g, 39%. $^{31}P\{^1H\}$ (toluene-$d_8$): δ 39.5 (d), 25.3 (d). $^1H$ NMR (toluene-$d_8$): δ 7.20 (m, 8H), 6.84 (m, 2H), 2.25 (s, 4H), 1.45 (d, 37H), 1.32 (d, 54H)

Solution Polymerization

Continuous solution polymerizations were conducted on a continuous polymerization unit (CPU) using cyclohexane as the solvent. The CPU contained a 71.5 mL stirred reactor and was operated at a temperature of 140° C., or 160° C. for the polymerization experiments. An upstream mixing reactor having a 20 mL volume was operated at 5° C. lower than the polymerization reactor. The mixing reactor was used to pre-heat the ethylene, 1-octene and some of the solvent streams. Catalyst feeds (xylene or cyclohexane solutions of phosphinimide pre-polymerization catalyst and $(Ph_3C)[B(C_6F_5)_4]$ as a catalyst activator) and additional solvent were added directly to the polymerization reactor in a continuous process. A total continuous flow of 27 mL/min into the polymerization reactor was maintained.

Copolymers were made at a 1-octene/ethylene weight ratio of 0.5, 0.3, or 0.15. The ethylene was fed at a 10 wt % ethylene concentration in the polymerization reactor. The CPU system operated at a pressure of 10.5 MPa. The solvent, monomer, and comonomer streams were all purified by the CPU systems before entering the reactor. The polymerization activity, $k_p$ (expressed in $mM^{-1} \cdot min^{-1}$), is defined as:

$$k_p = \left(\frac{Q}{100-Q}\right)\left(\frac{1}{[M]}\right)\left(\frac{1}{HUT}\right)$$

where Q is ethylene conversion (%) (measured using an online gas chromatograph (GC)), [M] is catalyst concentration in the reactor (mM), and HUT is hold-up time in the reactor (2.6 min).

Copolymer samples were collected at 90±1% ethylene conversion (Q), dried in a vacuum oven, ground, and then analyzed using FTIR (for short-chain branch frequency) and GPC-RI (for molecular weight and distribution). Polymerization conditions are listed in Tables 1 and 3 and copolymer properties are listed in Tables 2 and 4.

An inventive ethylene homopolymerization with the catalyst of Example 1 was carried out in polymerization Run No. 4, while inventive copolymerzations of ethylene with 1-octene with the catalyst of Example 1 were carried out in polymerization Run Nos. 1, 2 and 3 under decreasing ratios of comonomer.

Inventive copolymerizations of ethylene with 1-octene (and homopolymerization with ethylene) with the catalyst of Example 2 were carried out in polymerization Run Nos. 5, 6, 7 and 8 under decreasing ratios of comonomer.

Comparative copolymerizations of ethylene with 1-octene using the catalyst $((t-Bu)_3PN)_2TiMe_2$, which was first disclosed in U.S. Pat. No. 6,649,558, were carried out in polymerization Run Nos. 9, 10 and 11 under decreasing ratios of comonomer.

TABLE 1

Polymerization Conditions

| Polymerization Run. No. | Catalyst Example No. | [Metal] (μM) | B (from Borate)/Ti | Reactor Temp. (° C.) | C2 Flow (g/min) | C8/C2 | C2 conversion, Q (%) | $k_p$ ($mM^{-1} \cdot min^{-1}$) |
|---|---|---|---|---|---|---|---|---|
| 1 | 1 | 18.52 | 22.22 | 140 | 2.1 | 0.50 | 89.65 | 180 |
| 2 | 1 | 18.52 | 22.22 | 140 | 2.1 | 0.30 | 89.76 | 182 |
| 3 | 1 | 22.22 | 26.67 | 140 | 2.1 | 0.15 | 90.27 | 161 |
| 4 | 1 | 27.41 | 32.89 | 140 | 2.1 | 0 | 90.44 | 133 |
| 5 | 2 | 5.19 | 6.22 | 140 | 2.1 | 0.50 | 89.99 | 667 |
| 6 | 2 | 5.19 | 6.22 | 140 | 2.1 | 0.30 | 90.1 | 675 |
| 7 | 2 | 5.19 | 6.22 | 140 | 2.1 | 0.15 | 90.1 | 779 |
| 8 | 2 | 5.19 | 6.22 | 160 | 2.7 | 0 | 90.53 | 709 |
| 9 | Comp. | 0.63 | 0.75 | 140 | 2.1 | 0.50 | 89.26 | 5077 |
| 10 | Comp. | 0.63 | 0.75 | 140 | 2.1 | 0.30 | 89.40 | 5190 |
| 11 | Comp. | 0.63 | 0.75 | 140 | 2.1 | 0.15 | 90.72 | 6016 |

Note:
C2 = ethylene;
C8 = 1-octene

TABLE 2

Copolymer Properties

| Polymerization Run. No. | Catalyst Example No. | FTIR 1-octene content (weight percent, wt %) | FTIR Short Chain Branching per 1000 carbon atoms (SCB/1000 C) | Mw | Mn | Mw/Mn |
|---|---|---|---|---|---|---|
| 1 | 1 | 6.7 | 8.8 | 160848 | 86953 | 1.85 |
| 2 | 1 | 5.6 | 7.4 | 181136 | 92965 | 1.95 |
| 3 | 1 | 2.8 | 3.5 | 216885 | 98584 | 2.30 |
| 4 | 1 | — | — | 252868 | 119524 | 2.12 |
| 5 | 2 | 13.2 | 18.3 | 92413 | 39921 | 2.31 |
| 6 | 2 | 8.7 | 11.6 | 118880 | 56811 | 2.09 |
| 7 | 2 | 4.9 | 6.3 | 152397 | 77726 | 1.96 |
| 8 | 2 | — | — | 130292 | 65030 | 2 |
| 9 | Comp. | 17.3 | 24.9 | 41408 | 23233 | 1.78 |
| 10 | Comp. | 11.7 | 16 | 56408 | 30890 | 1.83 |
| 11 | Comp. | 6.9 | 9.1 | 81849 | 42992 | 1.9 |

A person skilled in the art will see from the data provided in Tables 1 and 2, that under similar copolymerization conditions, the catalysts of Inventive Examples 1 and 2, provide higher molecular weight ethylene copolymers than does the comparative catalyst system. Compare for example polymer Run Nos. 2, 6 and 10 in which similar polymerization conditions were employed. The catalyst of Inventive Example 1 gave a weight average molecular weight (Mw) of 181,136, the catalyst of Inventive Example 2 gave a weight average molecular weight (Mw) of 118,880, while the catalyst of the Comparative Example produced a copolymer with a weight average molecular weight (Mw) of only 56,408. A similar outcome is found when comparing Inventive Polymer Run Nos. 3 and 7 with Comparative polymer Run No. 11: the weight average molecular weights achieved are 216,885, 152,397 and 81,849 respectively. It is evident then, that by altering the steric and electronic parameters of the supporting phosphinimide ligands, by adding a sterically encumbered and strongly electron donating phosphinimide substituent to a phosphinimide ligand, a person skilled in the art can change the molecular weight performance of these catalysts with respect to ethylene copolymerization.

Further polymerization experiments were attempted using Zr and Hf analogous of the catalyst of Example 1 with more limited results (see Table 3 and 4). The Zr based catalyst of Example 3 gave copolymers of ethylene and 1-octene with poor (e.g. very low) molecular weights (e.g. the $M_w$ values were below about 10,000 g/mol; see Polymerization Run Nos. 12-14), while the Hf based catalyst of Example 4 gave results which may be consistent with catalyst disproportionation or decomposition pathways (e.g. low catalyst activity and very large molecular weights distributions: Mw/Mn of more than about 40, indicated that a single catalytic species was not present under polymerization conditions; see Polymerization Run No. 16). These results suggest that titanium may be the ideal group 4 metal for the presently disclosed ligand set.

TABLE 3

| | | | | Polymerization Conditions | | | | |
|---|---|---|---|---|---|---|---|---|
| Polymerization Run. No. | Catalyst Example No. | [Metal] (μM) | B (from Borate)/ Zr or Hf | Reactor Temp. (° C.) | C2 Flow (g/min) | C8/C2 | C2 conversion, Q (%) | $k_p$ ($mM^{-1} \cdot min^{-1}$) |
| 12 | 3 | 20.00 | 24.00 | 140 | 2.1 | 0.5 | 89.56 | 165 |
| 13 | 3 | 19.63 | 23.56 | 140 | 2.1 | 0.30 | 89.77 | 172 |
| 14 | 3 | 19.26 | 23.11 | 140 | 2.1 | 0.15 | 89.97 | 179 |
| 15 | 3 | 20.74 | 24.89 | 140 | 2.1 | 0 | 90.07 | 168 |
| 16 | 4 | 51.85 | 62.22 | 140 | 2.1 | 0.15 | 82.60 | 35 |

TABLE 4

| | | Copolymer Properties | | | | |
|---|---|---|---|---|---|---|
| Polymerization Run. No. | Catalyst Example No. | FTIR 1-octene content (weight percent, wt %) | FTIR Short Chain Branching per 1000 carbon atoms (SCB/1000 C) | Mw | Mn | Mw/Mn |
| 12 | 3 | 8.3 | 11.1 | 6055 | 1682 | 3.60 |
| 13 | 3 | 4.6 | 5.9 | 8104 | 3873 | 2.09 |
| 14 | 3 | 3.3 | 4.2 | 8194 | 2415 | 3.39 |
| 15 | 3 | — | — | 9867 | 3512 | 2.81 |
| 16 | 4 | 7.2 | 9.4 | 55055 | 1166 | 47.22 |

INDUSTRIAL APPLICABILITY

Group 4 transition metal catalysts may be used to facilitate the polymerization of ethylene and alpha olefins into commercially useful thermoplastic materials. The present disclosure provides a new group 4 transition metal polymerization catalyst which polymerizes ethylene with an alpha-olefin to produce ethylene copolymers having high molecular weight.

The invention claimed is:

1. A phosphinimide pre-polymerization catalyst having the following structure:

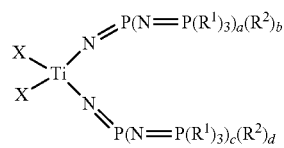

wherein P is phosphorus; N is nitrogen; each X is independently an activatable ligand; $R^1$ is independently selected from a hydrogen atom, a hydrocarbyl group which is unsubstituted or substituted with one or more halogen atom, an alkoxy group, an aryl group, an aryloxy group, an amido group, a silyl group, and a germanyl group; $R^2$ is independently a hydrocarbyl group which is unsubstituted or substituted with one or more halogen atom; a is 1, 2 or 3; b is 2, 1, or 0; a+b=3; c is 0, 1, 2 or 3; d is 3, 2, 1 or 0; and c+d=3.

2. The phosphinimide pre-polymerization catalyst of claim 1, wherein $R^1$ is independently a hydrocarbyl group which is unsubstituted or substituted with one or more halogen atom.

3. The phosphinimide pre-polymerization catalyst of claim 2, wherein $R^1$ is a tert-butyl group.

4. The phosphinimide pre-polymerization catalyst of claim 1, wherein $R^2$ is a tert-butyl group.

5. The phosphinimide pre-polymerization catalyst of claim 1, wherein each X is methide.

6. A polymerization catalyst system comprising:
i) a phosphinimide pre-polymerization catalyst having the following structure:

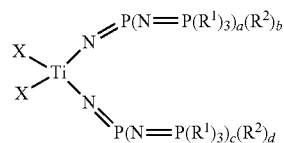

wherein P is phosphorus; N is nitrogen; each X is independently an activatable ligand; $R^1$ is independently selected from a hydrogen atom, a hydrocarbyl group which is unsubstituted or substituted with one or more halogen atom, an alkoxy group, an aryl group, an aryloxy group, an amido group, a silyl group, and a germanyl group; $R^2$ is independently a hydrocarbyl group which is unsubstituted or substituted with one or more halogen atom; a is 1, 2 or 3; b is 2, 1, or 0; a+b=3; c is 0, 1, 2 or 3; d is 3, 2, 1 or 0; and c+d=3; and ii) a catalyst activator.

7. A polymerization process comprising polymerizing ethylene optionally with one or more $C_{3-12}$ alpha olefins in the presence of a polymerization catalyst system comprising:

i) a phosphinimide pre-polymerization catalyst having the following structure:

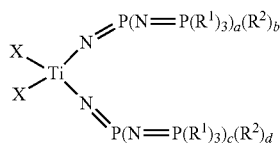

wherein P is phosphorus; N is nitrogen; each X is independently an activatable ligand; $R^1$ is independently selected from a hydrogen atom, a hydrocarbyl group which is unsubstituted or substituted with one or more halogen atom, an alkoxy group, an aryl group, an aryloxy group, an amido group, a silyl group, and a germanyl group; $R^2$ is independently a hydrocarbyl group which is unsubstituted or substituted with one or more halogen atom; a is 1, 2 or 3; b is 2, 1, or 0; a+b=3; c is 0, 1, 2 or 3; d is 3, 2, 1 or 0; and c+d=3; and ii) a catalyst activator.

8. The polymerization process of claim 7, wherein the polymerization process is a solution phase polymerization process carried out in a solvent.

9. The polymerization process of claim 8, wherein the process comprises polymerizing ethylene with one or more $C_{3-12}$ alpha olefins.

10. The polymerization process of claim 9, wherein the process comprises polymerizing ethylene with 1-octene.

* * * * *